July 7, 1942.                D. H. EGGERT                2,288,997
GAS FLOW CONTROL VALVE FOR SIGNAL LIGHTS
Filed June 18, 1940
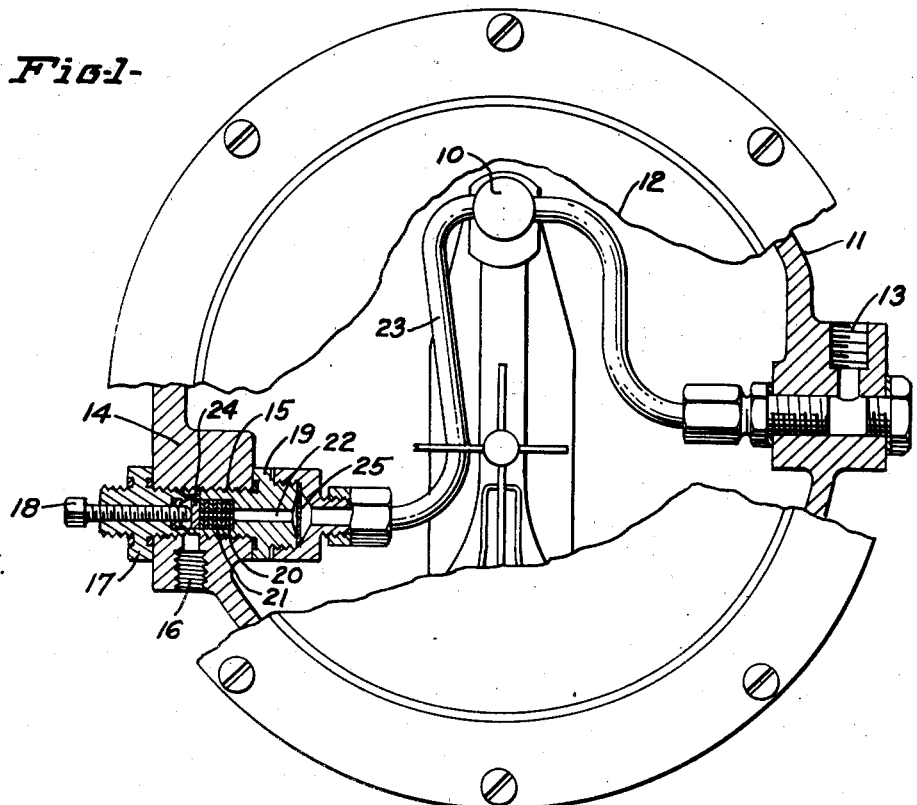
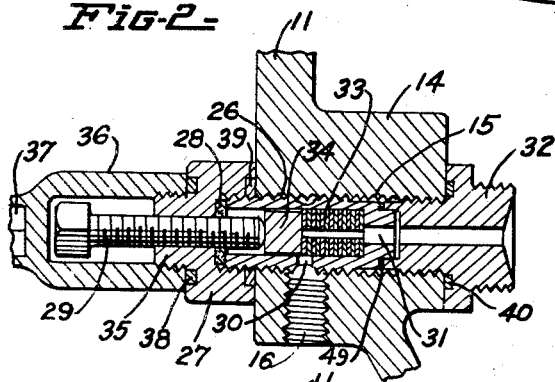
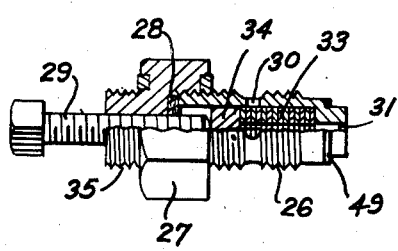
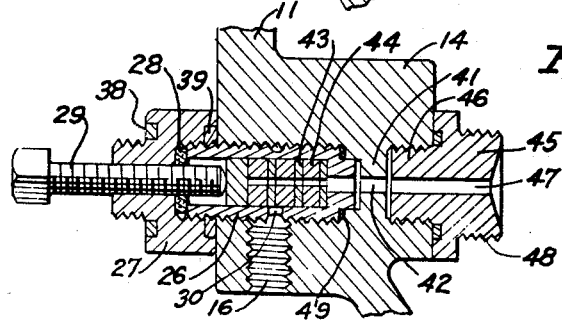
INVENTOR.
Daniel H. Eggert
BY
ATTORNEY Patented July 7, 1942

2,288,997

UNITED STATES PATENT OFFICE 2,288,997

GAS FLOW CONTROL VALVE FOR SIGNAL LIGHTS

Daniel H. Eggert, San Francisco, Calif.

Application June 18, 1940, Serial No. 341,133

4 Claims. (Cl. 138—46)

My present invention relates to a device for controlling the flow of gas under pressure, and more particularly to an improved gas flow regulating means for signal light controlling apparatus, such as is now used in the coast guard service for indicating shoals, breakwaters, channels, and the like.

An object of the invention is to provide a new and improved gas flow regulating device for enclosed intermittently operating light signal controlling valves, such, for example, as are illustrated and described in Gustaf Dalen Patent No. 952,420, dated March 15, 1910, and entitled Light signal apparatus.

Another object of the invention is to provide a new and improved gas flow regulating device which may be inserted and removed for adjustment and/or replacement from the gas supplying conduit of an enclosed signal light controlling valve in a simple and convenient manner and without dismantling the signal controlling valve enclosing housing.

In the past and at the present time it is the practice to regulate the flow of acetylene gas under pressure from flasks and/or other containers by inserting a spring wrapped in asbestos fibers or a series of alternately arranged metal and paper discs axially within the inlet conduit of a signal light valve enclosing housing and subjecting the asbestos wrapped spring or the metal and paper discs to pressure exerted by an adjustable screw which extends from the outside of the valve enclosing housing. This arrangement is open to the objection that the asbestos wrapping of the spring type regulator becomes saturated with by-products and/or impurities in the acetylene gas and becomes packed. The spring also corrodes and becomes inoperative and in the case of the alternately arranged metal and paper disc type of regulator, the paper discs become saturated and eventually char and become hard and brittle and thus their adjustability and flow controlling characteristics are also destroyed. It is, therefore, a further object of the present invention to provide a gas regulating means which is not subject to deterioration because of any chemical action resulting from contamination by impurities and/or by-products of the gas being regulated thereby.

Other objects and advantages of the invention will be in part evident to those skilled in the art and in part pointed out in the following description taken in connection with the accompanying drawing, wherein there is shown by way of illustration and not of limitation preferred embodiments thereof.

In the drawing:

Figure 1 is a plan view with parts broken away and in section showing signal light controlling apparatus of the Dalen type having a gas regulating device constructed in accordance with the present practice, Figure 2 is a slightly enlarged sectional view showing a gas regulating device constructed in accordance with the present invention and adapted for use upon a signal light controlling apparatus of the type illustrated in Figure 1, Figure 3 is a view partially in section showing a part of the gas regulating device removed from the other apparatus, and Figure 4 is a view similar to Figure 2 showing a modified form of the invention.

In order to illustrate and describe the invention and point out its novel difference in construction and the advantages thereof, reference will first be made to Figure 1 of the drawing for a general description of light signal controlling apparatus of the type illustrated in the aforementioned Dalen patent equipped with a gas regulating device constructed in accordance with the past and present practice. In this figure of the drawing and as described in the aforementioned Dalen patent, the light signal controlling apparatus comprises an intermittently operating valve 10 located in a chamber formed by an enclosing housing 11 that is sealed by a flexible diaphragm 12 which is adapted, upon the accumulation of a predetermined amount of gas in the enclosing housing 11, to open and permit the escape of gas through a conduit 13 to the burner of a light signal, such, for example, as is used with buoys and harbor lights. In operation, after the valve 10 has permitted the escape of the accumulated gas from the enclosing housing 11, the diaphragm 12 will return to its initial position and shut off the escape of gas through the conduit 13. Simultaneously with this operation, the valve 10 will also operate to open a second port and permit the flow of gas under pressure from a source of supply (not shown) to the enclosing housing below the diaphragm 12.

In order to regulate the period of operation of the valve 10 under the influence of the diaphragm 12, it is necessary, since the gas is supplied from a source of supply under varying pressure, to regulate the flow of gas to a substantially uniform amount when the apparatus is in operation. In accordance with the present practice, as illustrated in Figure 1 of the drawing, the enclosing housing 11 is provided with a thickened wall portion 14 having an elongated threaded opening 15 extending therethrough from the exterior to the interior of the enclosing housing 11. Communicating with the elongated opening 15 the enclosing housing 11 is also provided with an inlet conduit 16 which communicates with the opening 15 intermediate its ends. As shown, the outer end of the opening 15 is sealed by a threaded member 17 which terminates at a point adjacent the inlet conduit 16 and carries an adjustable screw 18 that can be adjusted from the exterior of the enclosing housing 11. Cooperating with the threaded member 17 and extending from the interior of the enclosing housing 11 there is a second threaded member 19 that has a cylindrical recess 20 into which an asbestos wrapped spring or a series of alternately arranged copper and paper discs 21 are located. As shown, the discs 21 have their central apertures arranged axially in alignment with a central opening 22 which is connected with the gas inlet port of the valve 10 by a pipe 23. Associated with the alternately arranged copper and paper discs 21, the member 19 also carries a spacer 24 against which the adjustable screw 18 is adapted to seat when the regulating device is installed in the housing 11.

With the above arrangement it will be seen that when gas from the source of supply is conducted to the conduit 16 by suitable piping, the gas will enter the cylindrical recess 20 formed in the threaded member 19 and flow inwardly between the alternately arranged copper and paper discs 21 to their central apertures and out through the central opening 22 to the gas inlet port of the valve 10. At this point it will be noted that the central opening 22 is provided with a fine mesh screen 25 that has been found necessary due to the fact that the paper discs 21 char with age and use and often break up so that small particles thereof are carried along with the gas. This screen 25 prevents these charred particles of the paper discs 21 from reaching and stopping up the relatively fine burner tip apertures.

In regulating devices of this prior art type, dependence is had on the porosity of the paper discs and the degree of compaction exerted thereupon by the adjustable screw 18. Therefore, it will be seen that when these paper discs char and become hard, their regulating characteristics will be entirely destroyed and as a result they will require frequent replacement which, with the apparatus as here constructed, cannot be conveniently and satisfactorily accomplished at the point of installation and, therefore, the entire light signal controlling device, including the valve 10, its enclosing housing 11 and the diaphragm 12, must be removed and replaced by an entire unit which has been previously adjusted by the maintenance man at the supply base or repair shop. Another difficulty of this arrangement resides in the fact that the regulating device cannot be adjusted until after it has been installed in the wall of an enclosing housing 11 and, therefore, when a replacement is required, it is necessary to disassemble the diaphragm 12 from the housing in order to expose the inner threaded member 19 of the regulating device, and while it might appear that the copper and paper discs 21 might be removed and replaced through the outer end of the threaded opening 15, it has been found that this is a difficult and almost impossible operation and at best affords only a makeshift repair.

Reference is now made to Figures 2 and 3 of the drawing for a detailed description of the present invention embodied in a form which renders it adaptable to light signal controlling apparatus of the type described above in connection with Figure 1 of the drawing. As shown in these figures of the drawing, the elongated opening 15 formed in the thickened portion 14 of the enclosing housing 11 carries a hollow threaded plug 26 which is adapted to be threaded into the opening 15 from the outside of the enclosing housing 11. This hollow threaded plug 26 is shown as carried by a hexagonal head forming portion 27 into which it is threaded and locked against displacement by means of a lockwasher 28 which, in practice, is generally of fiber or other compressible friction producing material. As shown, the hexagonal head forming portion 27 also carries a centrally arranged adjustable screw 29 which is adapted to be also locked against accidental displacement by means of the washer 28. Intermediate the ends of the hollow threaded plug 26, there is provided one or more radially disposed apertures or ports 30 which communicate with the interior thereof, and at its end this member has a centrally arranged outlet aperture 31 through which the regulated gas can flow to the control valve 10. Associated with the hollow threaded plug 26 and extending into the threaded opening 15 from the interior of the enclosing housing 11, there is a second threaded member 32 which provides a means of attachment for the conduit 23 which leads to the gas controlling valve, as hereinabove pointed out.

In my improved device, as here shown, and as distinguished from the prior art arrangement described above, the hollow threaded plug 26 carries a series of alternately arranged discs 33 in such a manner that it, together with these discs, can be removed, replaced and/or adjusted from the exterior of the enclosing housing 11. In addition to providing a regulating device which may be removed intact as a unit from the enclosing housing 11 with its attendant advantages, the present invention also provides an arrangement which will permit the gas regulating elements of the device to be adjusted at the shop and later applied to an operating unit in the field with a minimum of inconvenience. Another advantage of this arrangement is that the maintenance man may provide himself with a number of these regulating devices, each precisely adjusted to a different rate of flow at the supply or repair shop where suitable equipment and flow indicating means can be more conveniently employed.

A further and important feature of the present invention resides in the substitution of a soft metal foil for the paper discs 21 described above as now in use on prior art devices. In accordance with my present invention, I prefer to use a series of alternately arranged dished copper and aluminum foil discs, but it is to be understood that various other metals may be used in accordance with my invention. For example, it has been found that dry acetylene gas does not react with lead, copper, cadmium, tin, aluminum and zinc and, therefore, any one or two of these or similar metals may be used for this purpose. In Figure 2 I have shown a series of nine (9) copper discs alternated with ten (10) aluminum foil discs, and interposed between these discs and the adjusting screw 29 there is a spacing block 34 which serves to distribute the pressure over the entire area occupied by the discs 33. At this point it will be noted that the hexagonal head forming portion 27, like the threaded member 17 of the prior art device, is provided with a threaded extension 35 upon which a screw enclosing cap 36 is threaded, this cap 36 being generally provided with a hexagonal socket wrench forming recess 37 which may be used for effecting a turning of the adjustable screw 29. It will also be noted that the enlarged head forming portion 27 carries suitable packing washers 38 and 39 which serve to provide a gas tight seal with its associated surfaces. Likewise, the threaded member 32 is provided with a similar sealing washer 40.

In the embodiment of my invention illustrated in Figure 4 of the drawing, I have shown an arrangement wherein the enlarged portion 14 formed in the wall of the enclosing housing 11 is not drilled and threaded throughout its entire length, but is rather interrupted by an intermediate portion 41 of the casting through which a smaller gas conducting passage 42 is provided. In this arrangement the gas regulating aspects of my invention are substantially similar to those described in connection with Figure 2, except that instead of the nineteen (19) alternately arranged copper and aluminum foil washers 33, I use, as shown in this figure of the drawing, a series of three (3) dished copper washers 43 interspaced with an equal number of relatively thicker metal discs 44 which may be of aluminum or any one of the other metals above identified. Because of the presence of the intermediate portion 41 in the threaded opening 15 of the housing, there is a threaded member 45 which has a shorter extension 46 that is threaded into the thickened portion 14 of the enclosing housing 11 in axial alignment with the hollow threaded plug 26. This threaded member 45 also has a central aperture 47 and an externally threaded extension 48 to which the conduit pipe 23 leading to the control valve 10 may be attached. At this point it is important to note that the inner end of the hollow threaded plug 26 carries a packing washer or sealing gasket 49 which is adapted to seat against the inner threaded member 32, as shown in Figure 2, or the bottom of the threaded opening in which it is located, as shown in Figure 4 of the drawing. The purpose of this sealing gasket 49 is to prevent the escape of any of the regulated gas around the outside of the hollow threaded plug 26 and thus insures a full flow of the regulated gas to the signal light controlling valve 10.

It is believed that the operation of my invention will be understood from the above description. However, since metal foil and/or metallic washers have been substituted for paper discs, it should be stated that the flow of gas is regulated by the pressure between the contacting surfaces of the alternately arranged metal discs rather than by the compaction of a porous structure, such as is provided with the paper discs of the prior art. Therefore, since there is no danger of the metal foil or discs becoming charred or otherwise decomposed by the action of the gas flowing therethrough, it will be readily seen that I have provided a gas regulating device which may be easily and conveniently adjusted and one which after having been adjusted will retain this adjustment permanently and thus provide for a constant flow of gas throughout a longer period of time than has been possible with devices of the asbestos wrapped spring and paper disc types.

While I have, for the sake of clearness and in order to disclose my invention so that the same can be readily understood, described and illustrated specific devices and arrangements, I desire to have it understood that this invention is not limited to the specific means disclosed, but may be embodied in other ways that will suggest themselves to persons skilled in the art. It is believed that this invention is new and it is desired to claim it so that all such changes as come within the scope of the appended claims are to be considered as part of this invention.

Having thus described my invention, what I claim and desire to secure by Letters Patent is:

1. In a replaceable gas regulating device for apparatus of the character described having an internally threaded conduit with a gas inlet port intermediate its ends, the combination of an externally threaded hollow cylindrical member adapted at one end to be threaded into said internally threaded conduit, said member having a cavity with an opening at its inner end communicating with said conduit and a port intermediate its ends communicating with the gas inlet port of said conduit, a pressure responsive gas flow regulating means arranged within said cavity between the opening at its inner end and said port, a head forming means into which the outer end of said hollow cylindrical member is threaded adapted to close the outer end of said conduit, a threaded member carried by said head forming means adjustable to exert pressure upon said gas flow regulating means, whereby the regulating characteristics of said last means may be adjusted, and means carried by said head forming means for locking said hollow cylindrical member against relative movement with respect to said head forming means, whereby said hollow cylindrical member may be threaded into and removed from said conduit without affecting the regulating characteristics of said gas flow regulating means as determined by the adjustment of said threaded member.

2. In a replaceable gas regulating device for apparatus of the character described having an internally threaded conduit with a gas inlet port intermediate its ends, the combination of an externally threaded hollow cylindrical member adapted at one end to be threaded into said internally threaded conduit, said member having a cavity with an opening at its inner end communicating with said conduit and a port intermediate its ends communicating with the gas inlet port of said conduit, a series of annular metallic discs arranged axially in superimposed relation within said cavity between the opening at its inner end and said port, a head forming means into which the outer end of said hollow cylindrical member is threaded adapted to close the outer end of said conduit, a threaded member carried by said head forming means adjustable to exert pressure upon said superimposed annular discs, whereby the regulating characteristics thereof may be adjusted, and means carried by said head forming means engaging and locking said hollow cylindrical member against relative movement with respect to said head forming means, whereby said hollow cylindrical member may be threaded in and removed from said conduit without affecting the regulating characteristics of said superimposed annular metallic discs as determined by the adjustment of said threaded member.

3. In a replaceable gas regulating device for apparatus of the character described having an internally threaded conduit with a gas inlet port intermediate its ends, the combination of an externally threaded hollow cylindrical member adapted at one end to be threaded into said internally threaded conduit, said member having a cavity with an opening at its inner end communicating with said conduit and a port intermediate its ends communicating with the gas inlet port of said conduit, a series of annular relatively hard and soft metallic discs arranged alternately in superimposed relation within said cavity between the opening at its inner end and said port, a head forming means into which the outer end of said hollow cylindrical member is threaded adapted to close the outer end of said conduit, a threaded member carried by said head forming means adjustable to exert pressure upon said superimposed annular discs, whereby the regulating characteristics of said discs may be adjusted, and means carried by said head forming means engaging said threaded member and locking said hollow cylindrical member against relative movement with respect to said head forming means, whereby said hollow cylindrical member may be threaded into and removed from said conduit without affecting the regulating characteristics of said superimposed annular metallic discs as determined by the adjustment of said threaded member.

4. In a replaceable gas regulating device for apparatus of the character described having an internally threaded conduit with a gas inlet port intermediate its ends, the combination of an externally threaded hollow cylindrical member adapted at one end to be threaded into said internally threaded conduit, said member having an axially extending central cavity with an opening at its inner end communicating with said conduit and a port intermediate its ends communicating with the gas inlet port of said conduit, a series of annular copper and aluminum discs arranged alternately in superimposed relation within said cavity between the opening at its inner end and said port, a head forming means into which the outer end of said hollow cylindrical member is threaded adapted to close the outer end of said conduit, a threaded member carried by said head forming means adjustable to exert pressure upon said superimposed annular discs, whereby the regulating characteristics of said discs may be adjusted, and means carried by said head forming means for locking said hollow cylindrical member against relative movement with respect to said head forming means, whereby said hollow cylindrical member may be threaded into and removed from said conduit without affecting the regulating characteristics of said superimposed annular metallic discs as determined by the adjustment of said threaded member.

DANIEL H. EGGERT.